(12) United States Patent
Leidel et al.

(10) Patent No.: US 12,546,593 B2
(45) Date of Patent: *Feb. 10, 2026

(54) DIGITAL LEVEL

(71) Applicant: Milwaukee Electric Tool Corporation, Brookfield, WI (US)

(72) Inventors: Matthew Leidel, Wind Lake, WI (US); Gareth J. Mueckl, Milwaukee, WI (US); Eric Mackey, Milwaukee, WI (US); Gary Lee McMurray, Pewaukee, WI (US); Taylor Wayne Crenshaw, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 363 days.

This patent is subject to a terminal disclaimer.

(21) Appl. No.: 18/320,043

(22) Filed: May 18, 2023

(65) Prior Publication Data

US 2023/0288199 A1 Sep. 14, 2023

Related U.S. Application Data

(63) Continuation of application No. 17/398,699, filed on Aug. 10, 2021, now Pat. No. 11,692,820, which is a
(Continued)

(51) Int. Cl.
*G01C 9/06* (2006.01)
*G01C 9/00* (2006.01)

(52) U.S. Cl.
CPC ............. *G01C 9/06* (2013.01); *G01C 9/00* (2013.01); *G01C 2009/066* (2013.01)

(58) Field of Classification Search
CPC ............. G01C 9/02; G01C 2009/062; G01C 2009/064; G01C 2009/0066; G01C 2009/068; G01C 9/06
(Continued)

(56) References Cited

U.S. PATENT DOCUMENTS 4,152,839 A * 5/1979 McDonald .............. G01C 9/06
33/366.12
4,167,818 A 9/1979 Cantarella
(Continued)

FOREIGN PATENT DOCUMENTS

CN 2031916 2/1989
CN 2090516 12/1991
(Continued)

OTHER PUBLICATIONS

International Search Report and Written Opinion for International Application No. PCT/US2019/015110, dated May 17, 2019, 12 pages.

*Primary Examiner* — George B Bennett
(74) *Attorney, Agent, or Firm* — Reinhart Boerner Van Deuren s.c.

(57) ABSTRACT

A tool, such as a digital level, having multiple methods of indicating the orientation of the level. One embodiment of the level includes two or more accelerometers arranged in complimenting orientations, such as 90 degrees with respect to each other. The complimenting orientation allows for more precise measurements from less expensive accelerometers compared to a level with a single more expensive accelerometer. A power supply module, and an associated control module in charge of the power supply, selectively provides power to the accelerometers and displays based in part on user input, movement of the level, and the disposition of the level.

20 Claims, 11 Drawing Sheets

Related U.S. Application Data continuation of application No. 16/269,030, filed on Feb. 6, 2019, now Pat. No. 11,092,435, which is a continuation of application No. PCT/US2019/015110, filed on Jan. 25, 2019.

(60) Provisional application No. 62/663,945, filed on Apr. 27, 2018, provisional application No. 62/622,011, filed on Jan. 25, 2018.

(58) Field of Classification Search
USPC ............... 33/354, 366.11, 366.13, 366.27
See application file for complete search history.

(56) References Cited

U.S. PATENT DOCUMENTS

| | | |
|---|---|---|
| 4,182,046 A | 1/1980 | Ludlow et al. |
| 4,244,117 A | 1/1981 | Cantarella |
| 4,467,527 A | 8/1984 | North et al. |
| 4,481,720 A | 11/1984 | Sury |
| 4,503,622 A * | 3/1985 | Swartz ............ G01C 9/06 33/366.14 |
| 4,590,680 A | 5/1986 | Hanchett et al. |
| 4,625,423 A | 12/1986 | Sackett |
| 4,716,534 A | 12/1987 | Baucom et al. |
| 4,833,788 A | 5/1989 | Munro |
| 4,912,662 A | 3/1990 | Butler et al. |
| 4,942,668 A * | 7/1990 | Franklin ............ G01B 11/26 33/366.23 |
| 5,136,784 A | 8/1992 | Marantz |
| 5,313,713 A * | 5/1994 | Heger ............ G01C 9/06 33/343 |
| 5,335,190 A | 8/1994 | Nagle et al. |
| 5,479,715 A * | 1/1996 | Schultheis ............ G01C 9/32 33/366.27 |
| 5,488,779 A * | 2/1996 | Schultheis ............ G01C 9/32 33/366.27 |
| 5,956,260 A | 9/1999 | Heger et al. |
| 6,058,617 A | 5/2000 | Nadu |
| 6,128,076 A * | 10/2000 | Sackett ............ G01C 9/24 356/249 |
| 6,493,955 B1 | 12/2002 | Moretti |
| 6,688,011 B2 | 2/2004 | Gamal et al. |
| 6,874,240 B1 | 4/2005 | Cruttenden |
| 7,086,165 B2 | 8/2006 | Cato |
| 7,610,689 B1 | 11/2009 | Zhang |
| 7,743,520 B1 | 6/2010 | Jiorle |
| 7,802,372 B1 | 9/2010 | Silberberg |
| 7,861,424 B2 | 1/2011 | Munroe et al. |
| 7,975,394 B2 | 7/2011 | Mollmer et al. |
| 8,220,171 B2 | 7/2012 | Ben-Josef et al. |
| 8,359,757 B1 | 1/2013 | Ruys |
| 8,413,343 B2 | 4/2013 | Hale |
| 8,661,701 B2 * | 3/2014 | Wixey ............ G01C 9/06 33/534 |
| 8,769,839 B1 * | 7/2014 | Paesano ............ B64C 27/008 33/366.11 |
| 8,857,069 B2 | 10/2014 | Adegawa |
| 8,952,682 B2 * | 2/2015 | Mahan ............ G01R 33/0023 702/92 |
| 9,052,191 B1 | 6/2015 | Keate |
| 9,528,827 B2 | 12/2016 | Carniato |
| 10,436,584 B2 * | 10/2019 | Gray ............ G01C 9/26 |
| 11,092,435 B2 * | 8/2021 | Leidel ............ G01C 9/00 |
| 11,353,325 B2 * | 6/2022 | Mueckl ............ G01C 9/06 |
| 11,692,820 B2 * | 7/2023 | Leidel ............ G01C 9/00 33/301 |
| 2003/0229997 A1 | 12/2003 | Gamal et al. |
| 2004/0194329 A1 | 10/2004 | Drahos et al. |
| 2005/0166410 A1 | 8/2005 | Richter et al. |
| 2006/0064888 A1 | 3/2006 | Chen |
| 2006/0137198 A1 | 6/2006 | Cato |
| 2007/0000139 A1 | 1/2007 | Chen |
| 2007/0180719 A1 | 8/2007 | Donnelly et al. |
| 2007/0193046 A1 | 8/2007 | Arlinsky |
| 2007/0253173 A1 * | 11/2007 | Dart ............ G01C 9/06 361/736 |
| 2008/0120853 A1 | 5/2008 | Munroe et al. |
| 2008/0263880 A1 | 10/2008 | Hess |
| 2010/0275456 A1 | 11/2010 | Lord |
| 2010/0315070 A1 | 12/2010 | Hong |
| 2014/0101950 A1 | 4/2014 | Zhuang |
| 2015/0185049 A1 * | 7/2015 | Baxter ............ G01D 5/2412 33/706 |
| 2016/0054124 A1 | 2/2016 | Schaefer |
| 2016/0138916 A1 | 5/2016 | Leidel |
| 2024/0288269 A1 * | 8/2024 | Dorrough ............ G01C 9/06 |

FOREIGN PATENT DOCUMENTS

| | | |
|---|---|---|
| CN | 2345950 | 10/1999 |
| CN | 1242075 | 1/2000 |
| CN | 2459617 | 11/2001 |
| CN | 2475993 | 2/2002 |
| CN | 2509562 | 9/2002 |
| CN | 2777492 | 5/2006 |
| CN | 201100842 | 8/2008 |
| CN | 201218728 | 4/2009 |
| CN | 201277859 | 7/2009 |
| CN | 201463884 | 5/2010 |
| CN | 101726281 | 6/2010 |
| CN | 201583270 | 9/2010 |
| CN | 201653409 | 11/2010 |
| CN | 202501845 | 10/2012 |
| CN | 202630882 | 12/2012 |
| CN | 202770439 | 3/2013 |
| CN | 203132538 | 8/2013 |
| CN | 104132648 | 11/2014 |
| CN | 204115720 | 1/2015 |
| CN | 204165551 | 2/2015 |
| CN | 204461420 | 7/2015 |
| CN | 204718594 | 10/2015 |
| CN | 205014978 | 2/2016 |
| CN | 205192481 | 4/2016 |
| CN | 205449051 | 8/2016 |
| CN | 205940343 | 2/2017 |
| CN | 205957966 | 2/2017 |
| CN | 206019641 | 3/2017 |
| CN | 206223068 | 6/2017 |
| DE | 3205206 | 8/1983 |
| DE | 3208811 | 7/1984 |
| DE | 3735172 | 2/1990 |
| DE | 4438557 | 5/1996 |
| DE | 20300047 | 3/2003 |
| DE | 10300088 | 7/2004 |
| EP | 0401815 | 10/1993 |
| KR | 10-2008-0109964 | 12/2008 |
| KR | 20170071249 | 6/2017 |
| KR | 10-1756746 | 7/2017 |
| WO | WO9415174 | 7/1994 |
| WO | WO9963305 | 12/1999 |
| WO | WO0113065 | 2/2001 |
| WO | WO2008058724 | 5/2008 |
| WO | WO2012095538 | 7/2012 |

* cited by examiner

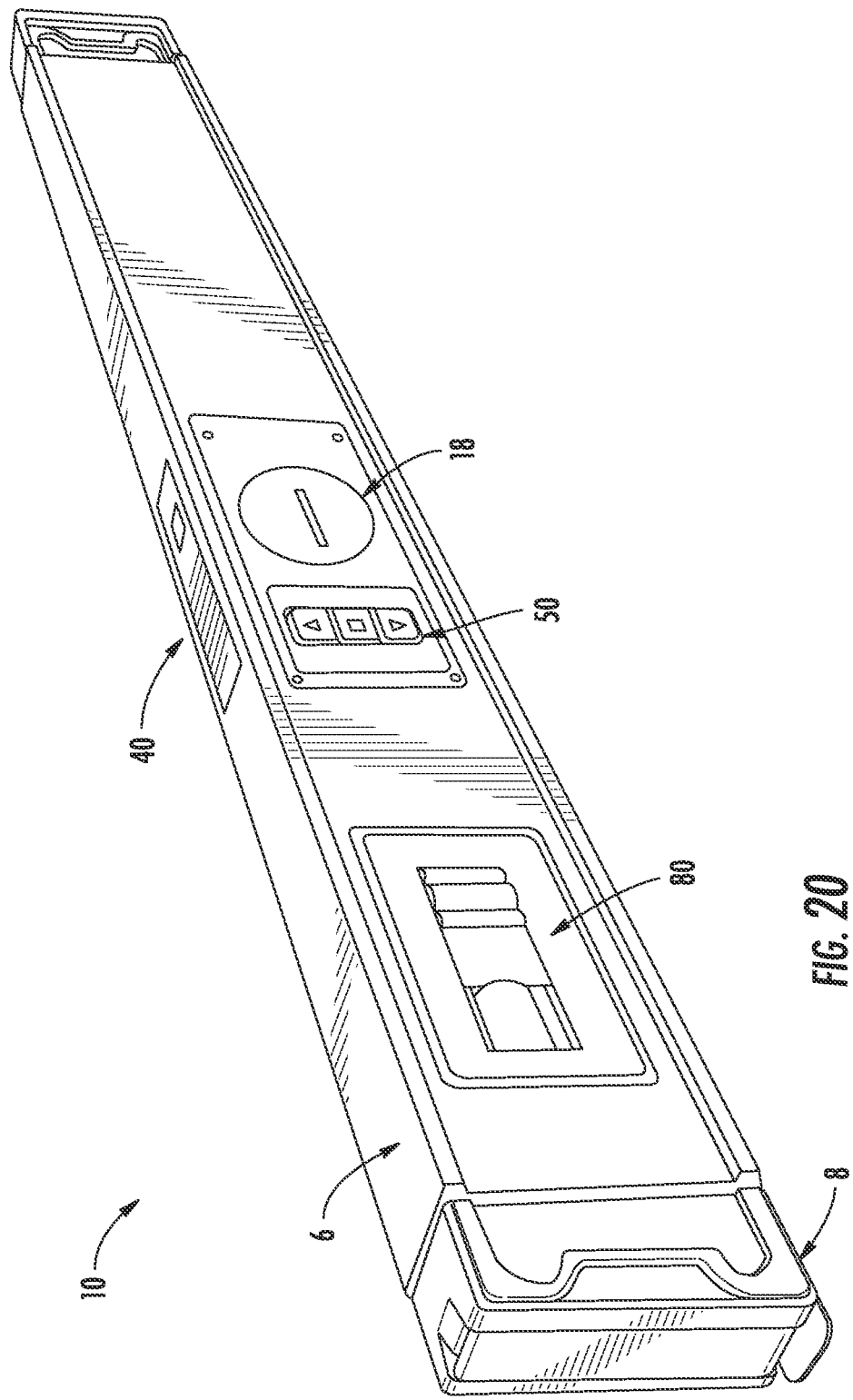

DIGITAL LEVEL

CROSS-REFERENCE TO RELATED PATENT APPLICATIONS

This application is a continuation of U.S. patent application Ser. No. 17/398,699, filed Aug. 10, 2021, which is a continuation of U.S. patent application Ser. No. 16/269,030, filed Feb. 6, 2019, which issued as U.S. Pat. No. 11,092,435 on Aug. 17, 2021, which is a continuation of International Application No. PCT/US2019/015110, filed Jan. 25, 2019, which claims priority from U.S. Provisional Application No. 62/622,011, filed Jan. 25, 2018, and U.S. Provisional Application No. 62/663,945, filed Apr. 27, 2018, and the contents of which are incorporated herein in their entireties.

BACKGROUND OF THE INVENTION

The present invention relates generally to the field of levels, and more specifically to a digital level.

Levels are used for a variety of applications, particularly in the building and construction trades. Traditionally, to measure orientation a level uses one or more vials that contain a liquid (e.g., ethanol) and a small bubble of gas (e.g., air). The walls of the vial are arcuate-shaped such that when the level is placed on a sufficiently horizontal or vertical surface, the bubble of air is aligned at or near the center of at least one of the vials.

SUMMARY OF THE INVENTION

In one embodiment, a level comprises a housing. The housing comprising a longitudinal axis, a planar base surface, a top surface opposing the base surface, an orientation sensor, such as an accelerometer, a controller and a display. The controller calculates an orientation difference between the housing orientation and a target orientation. The target orientation is one of a selected orientation and a default target orientation (e.g., level with level ground, plumb to level ground).

The level comprises one or more displays, one of which is on a front surface of the housing and another is on a top surface of the housing. The display on the front surfaces emits a first image that rotates with respect to the housing such that alphanumeric characters in the first image are orientated level with respect to level ground independent of the orientation of the level itself.

One embodiment of the invention relates to a digital level that includes two accelerometers, a display and a power supply. The accelerometers are disposed in a complimentary arrangement, such as a 90 degree rotation with respect to each other. Thus, the resolution error for using the combination of the two accelerometers is minimized for different orientations. In some embodiments, the accelerometers generate input signals that are processed by a processor to determine an orientation of the level housing, which is then used to display the orientation to the user.

In one embodiment, features on a circular display rotate so that the features are perpendicular with respect to the downward pull of gravity, and thus generally horizontal with respect to level ground. For example, a number representing the orientation (e.g., angle) of the level, the battery status of the level, a line indicating the orientation of the level, a line indicating the plumb line that is parallel to the downward pull of gravity, and the target orientation may be continually rotated around the display so that they maintain the same orientation with respect to level ground.

In another embodiment, the display of the level changes its background color when the level is within an acceptable range of the target angle. For example, the background may be a first color or pattern (e.g., green, a solid color, etc.) when the level is reading within the primary acceptable range, a second color or pattern different from the first color or pattern (e.g., yellow, a checked pattern, etc.) when the level reading is outside the primary acceptable range but within the secondary acceptable range, and/or a third color or pattern different from the first and second colors (e.g., red, flashing, etc.) when the level reading is outside the secondary acceptable range.

In another embodiment, alternate angles (e.g., angles other than 0 or 90 degrees) may be selected as the target orientation for the level. For example, a user may place the level on a surface that is oriented at an angle the user wants to duplicate. The target button is depressed while the level is at the desired orientation, and subsequently the level identifies that orientation as the target angle. Alternatively, a user may manually enter or adjust a target angle via the one or more input buttons.

In one or more embodiments, the digital level includes a control module that reduces or minimizes the power draw on the power supply (e.g., the batteries). For example, the control module may be configured to enter a sleep mode in any of several situations, such as when the device has not received user input for a threshold period of time. The control module may also utilize a depleted operational mode when the battery supply is below a threshold amount of power. In the depleted operational mode the display may be dimmer, one of the displays may be entirely turned off, and/or the level may enter sleep mode after a threshold period of time that is shorter than during normal operations, etc.

In one embodiment, the level includes a coarse view mode and a detailed view mode. As the level housing's orientation approaches the target orientation, the level (e.g., a controller) determines to switch the display to a detailed view mode based on a comparison of the level orientation to the target orientation. The transition point from the coarse view mode to the detailed view mode is user-configurable, and may have a default value of 3 degrees in either direction from the target orientation.

In the detailed view mode, the marks on the level's display that correspond to the level's orientation exaggerate the angle of the level. For example, if the level's physical orientation is 3 degrees away from the target orientation, the level's displayed orientation is at a 30 degree angle from the target orientation. As the level's physical orientation approaches the target orientation, the level's displayed orientation correspondingly approaches the target orientation mark on the display. In various embodiments changes to the level's physical orientation linearly correspond to changes to the level's displayed orientation (e.g., when the level changes orientation 1 degree towards the target orientation, the displayed orientation changes 10 degrees towards the target orientation).

In various embodiments, the target orientation of the level can be toggled to its mirror-image. For example, if the target orientation is the left-side of the level being 13 degrees higher than the right-side of the level, the mirror-image target orientation is the right-side of the level being 13 degrees higher than the left-side of the level. One method of toggling the target orientation to its mirror-image is to double-tap an input button.

In various embodiments, the display lists several user-selectable target orientations. The entries in the list can be changed depending on the circumstances that the level is being used in.

In various embodiments, the level includes several power modes. In a Sleep Mode, the display(s) of the level are disabled and the input buttons, except for the power button, are similarly disabled. If the level includes multiple processors, the processor that requires less energy to operate is used while in Sleep Mode.

The level may enter Sleep Mode for any of several reasons, including the level being immobile for a time period, the level being placed in a predetermined orientation (e.g., on its face with the front display on the bottom).

The level also has a Depleted Mode that the level enters when the battery power source for the level is below a predetermined level (e.g., 10%, 20%). In the Depleted Mode, the level may disable the display that requires more energy to operate (e.g., the front display).

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

FIG. 20 is a perspective view of a level, according to an exemplary embodiment.

DETAILED DESCRIPTION

Referring generally to the figures, various embodiments of a digital level are shown. Various embodiments of the digital level discussed herein include an orientation sensor that includes an accelerometer orientation/arrangement to measure the level housing's orientation and provide increased accuracy in readings for angles frequently used (e.g., housing orientations horizontal to the ground and perpendicular to the ground). In particular, the orientation sensor includes a pair of accelerometers rotationally oriented relative to each other in a manner that improves orientation reading accuracy. Applicant believes that by using a plurality of accelerometers positioned in a complimentary fashion as discussed herein, more accurate position readings are provided while allowing for use of lower quality, lower cost and/or lower accuracy accelerometers (as compared to a design that provides orientation reading via a single high quality/high accuracy accelerometer).

In one embodiment, the level includes a coarse view mode and a detailed view mode. When the level's orientation gets sufficiently close to the target orientation, the display switches to a detailed view mode. In the detailed view mode, the marks on the level's display that correspond to the level's orientation exaggerate the angle of the level. For example, if the level's physical orientation is 3 degrees away from the target orientation, the level's display indicates an orientation that is 30 degrees from the target orientation.

In various embodiments, the level includes several power modes, including a Power Mode, a Sleep Mode, and a Depleted Mode. For each of these modes various components and/or features of the level may be disabled or have a reduced functionality. One benefit of these modes is to save power for the level, which increases runtime of the level.

In one embodiment, level includes a level body housing defining at least one reference surface that is configured to engage a workpiece. To save power when not in use, the level controller selectively uses a sleep mode based on remaining battery power, user input, sensed movement, and/or level orientation. The level controller also selectively uses a reduced functionality mode that limits and/or reduces power to some features (e.g., allowing the display to emit bright light) in order to maintain power for other features (e.g., power the orientation sensor). Applicant believes this innovative power usage approach will eliminate the need for a bulky and expensive battery while still allowing the level to be powered for a sufficient duration.

Figure 1:
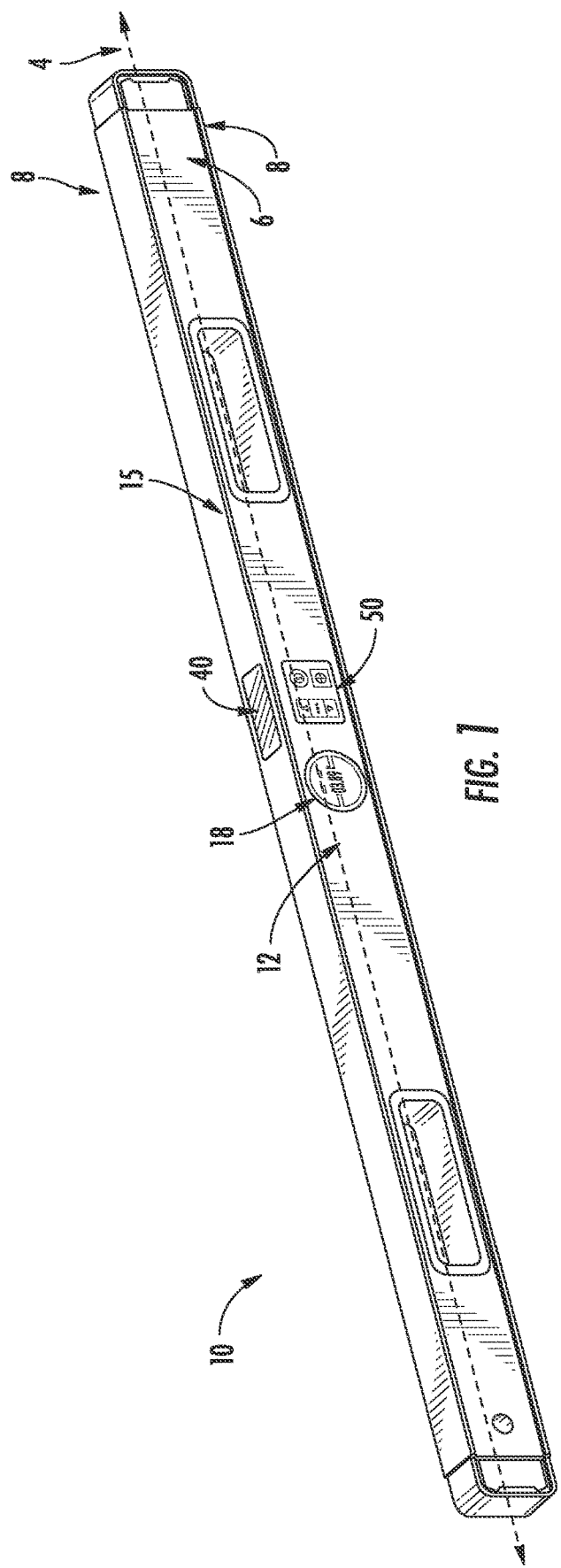
FIG. 1 is a perspective front view of a level, according to an exemplary embodiment.
Figure 2:
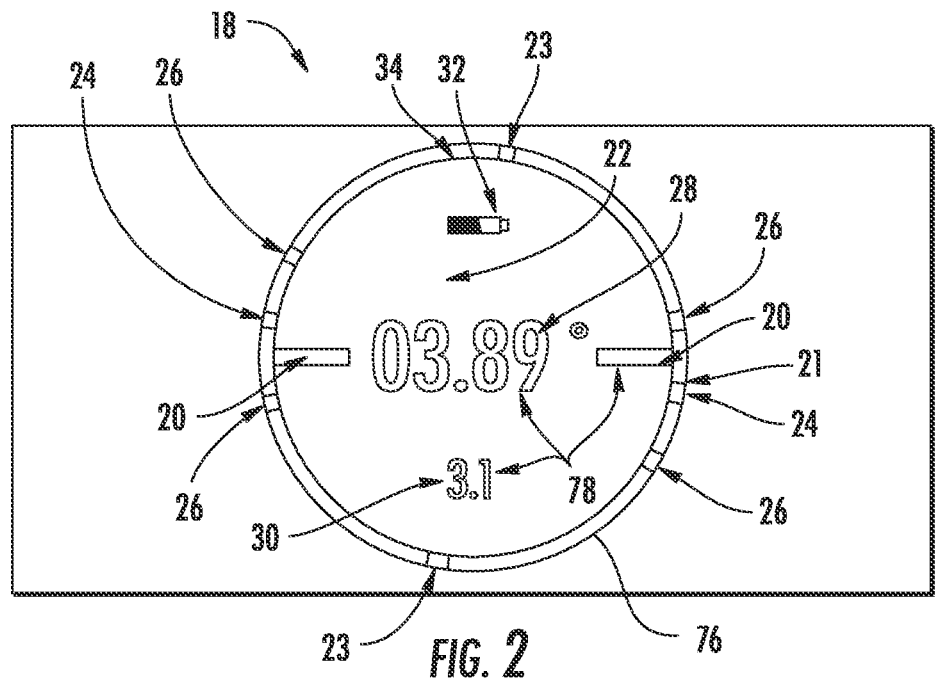
FIG. 2 is a detailed front view of the sidewall display of the level of FIG. 1, according to an exemplary embodiment.
Figure 3:
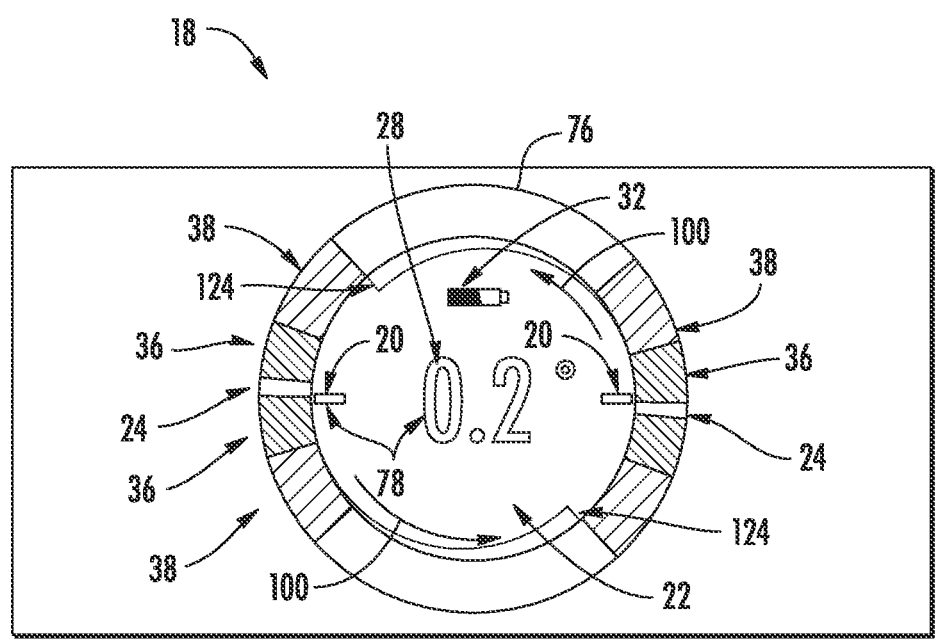
FIG. 3 is a detailed front view of the sidewall display of the level of FIG. 1, according to another exemplary embodiment.

Referring to FIGS. 1-3, a level, such as digital level 10, is shown according to an exemplary embodiment. In general, level 10 includes housing 15, controller 12, first display 18, second display 40, and input module 50. The level body includes a generally planar base surface 8 and an opposing upper surface 8 that is generally parallel to the planar base surface. As will be generally understood, the base of the level is placed on a workpiece (e.g., a structure, surface, etc.) in order for the user of the level to measure the orientation of a surface of the workpiece, including but not limited to whether the surface is level or plumb.

Level 10 includes first measuring surfaces 8 on a top and bottom of level 10 (from the perspective of FIG. 1), and second measuring surfaces 6 on a front and back of level 10 (from the perspective of FIG. 1). Measuring surfaces of level 10 provide very flat surfaces that permit level 10 to measure the orientation of other objects by placing one of the measuring surfaces of level 10 against the object being measured. It is considered that level 10 may have any number of measuring surfaces (e.g., 1-4). Level 10 also includes a longitudinal primary axis 4 that is aligned with the length of level 10.

First display 18 is the primary output device and is arranged on an exterior sidewall of housing 15. First display 18 includes one or more instances of alphanumeric characters, such as target 24, which represents the target orientation of level 10. Reading line 20 indicates the orientation difference between the current orientation of level 10 and a perceived direction of the force of gravity according to signals received from the accelerometers. For example, in FIG. 2 both targets 24 are not aligned with reading line 20. In particular, the right-most target 24 is below reading line 20, and the left-most target 24 is above reading line 20. This indicates that level 10 is tilted such that the right-side of level 10 (from the perspective of FIG. 2) is too high, and the left-side of level 10 is too low.

Plumb indicators 23 correspondingly are oriented 90 degrees with respect to target 24, so that while target 24 tracks the target orientation of the primary axis of level 10, plumb indicator 23 tracks the Normal with respect to that target orientation (for example, when the target orientation is horizontal with respect to the ground, such as for level ground, plumb indicator 23 is vertical with respect to the ground).

In the example in FIG. 2, the actual reading 28 of level's orientation is 3.89 degrees. In this example, this orientation is within the acceptable range of readings, which is represented by acceptable margin 26. In one or more embodiments, acceptable margin 26 is a fixed number of degrees different than the target, such as a predetermined number of degrees (e.g., 6 degrees in either direction, 0.3 degrees in either direction), although a user may configure level 10 to have a user-customized acceptable margin 26. In one or more embodiments discussed herein the orientation of level generally refers to the orientation of the level's housing.

As level 10 is rotated perpendicularly to its primary axis by tilting either end up or down, both targets 24 correspondingly rotate within first display 18. For example, if the right-side of level 10, as seen in FIG. 2, is moved upward, then the right-most target 24 and the right-most acceptable margins 26 will correspondingly rotate counter-clockwise around periphery 34 of display 18. Thus, even though display 18 is not physically rotating, elements 78 in image 76 within display 18 are rotating in concert with the rotation of level 10. It is contemplated that all or part of image 76 may rotate with respect to housing 15. In one or more embodiments image 76 comprises multiple images 76, at least one of which rotates with respect to the housing and at least one of which does not rotate with respect to the housing (e.g., a first image 76 rotates with respect to housing 15 so that the first image 76 is level with the ground independent of the orientation of housing, and a second image does not rotate with respect to the housing 15).

In one or more embodiments, first display 18 comprises a rectangle-shaped display (e.g., LCD, plasma, OLED, QLED, etc.) with a circular cutout in housing 15 in front of first display 18, thus making it appear circular. Alternatively, it is also considered that first display 18 is a circular display.

Different background colors 22 are used to indicate to users at a distance if level 10 is perfectly or closely aligned with the target. For example, when reading line 20 and target 24 are aligned and/or nearly aligned, background 22 may be a color that is easy to recognize from a distance, such as green, which indicates that the level is perfectly or nearly perfectly aligned with the target. When reading line 20 and set target 24 are not aligned, but reading line 20 is within acceptable margin 26, background 22 may be yellow, which indicates that the level's orientation is within the acceptable range, although not perfectly aligned. When reading line 20 is outside the markings of acceptable margin 26, background 22 may be black and the lettering is white, which indicates that the orientation of level 10 is not acceptable, and thus the underlying structure that level 10 is disposed against should be adjusted.

Battery status 32 is used to communicate the remaining amount of charge in power supply module 14 (e.g., a battery). Power supply module 14 may include one or more batteries, which are arranged within housing 15.

Turning to FIG. 3, in another embodiment and/or configuration, rather than using acceptable margin markings 26, target ranges are used. When reading line 20 is within primary target range 36, then background 22 may be a first color (e.g., green) to indicate that the current orientation is acceptable. When reading line 20 is outside primary target range 36 but within secondary target range 38, background 22 may be a second color (e.g., yellow) to indicate that the current is close but not perfect, and thus may be acceptable for some less-demanding situations (e.g., a wooden support beam with an uneven surface may only need to be "mostly" level, in part because the uneven surface makes it difficult to determine a precise orientation). When reading line 20 is outside secondary target range 38, background 22 may be a third color (e.g., black) while the numbers and features are in white.

In one embodiment, secondary target range 38 is a fixed number of degrees broader than primary target range 36, such as a predetermined number of degrees (e.g., 0.5 degrees broader in both directions, 1 degree broader in both directions, 5 degrees broader in both directions, 10 degrees broader in both directions). In another embodiment, secondary target range 38 is a relative amount broader than primary target range 36 (e.g., 25% broader in both directions, 50% broader in both directions, 100% broader in both directions, 200% broader in both directions).

In another embodiment, primary target range 36 is non-symmetrical with respect to the target reading (e.g., 1 degree in one direction and 0.5 degrees in the other direction). Similarly, it is also contemplated that secondary target range 38 is non-symmetrical.

In one or more embodiments, several visual features, such as elements 78 in first display 18, rotate within first display 18 to maintain a horizontal orientation with respect to the ground. For example, even if housing 15 of level 10 is at a 45 degree angle with respect to the ground, then several elements 78 in first display 18, such as reading 28, battery status 32, reading line 20, and history 30, are horizontal with respect to the ground. Therefore, in this example reading 28, battery status 32, reading line 20, and history 30 would be displayed at a 45 degree angle with respect to housing 15. However, because these elements 78 are horizontal with respect to the ground, they are easier for a user to read.

While the one or more features rotate around first display 18, first display 18 does not itself rotate physically. Instead, graphic features are displayed on first display 18 in a manner that provides the appearance of physical rotation.

History 30 displays a recent measurement recorded by level 10. For example, in FIG. 2 history 30 displays "3.1", to indicate that the previous recorded orientation of level was at that angle. A measurement may be recorded by level by any of several methods, including pressing a certain input button on level 10, or leaving level 10 in a certain orientation for a threshold length of time. By interacting with input module 50, described below, a user may store any of several historical measurements, and display one or more of those historical measurements at history 30.

Figure 4:
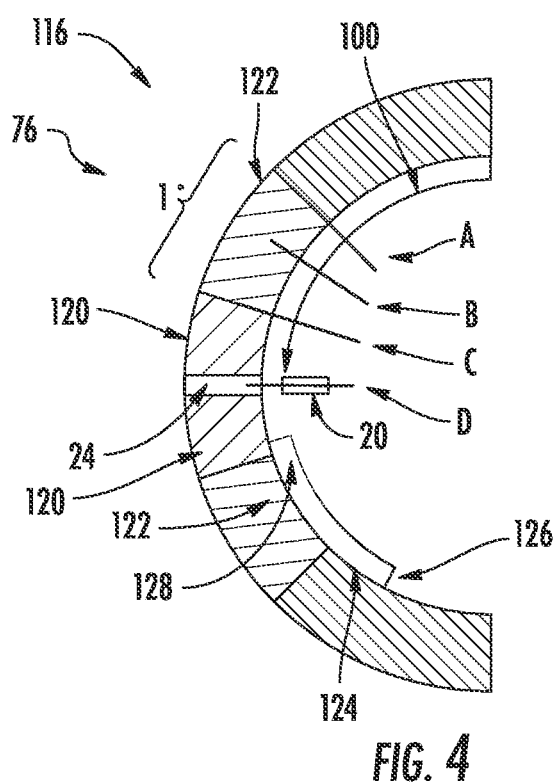
FIG. 4 is a detailed and annotated front view of a portion of the sidewall display of the level of FIG. 1, according to an exemplary embodiment.
Figure 5:
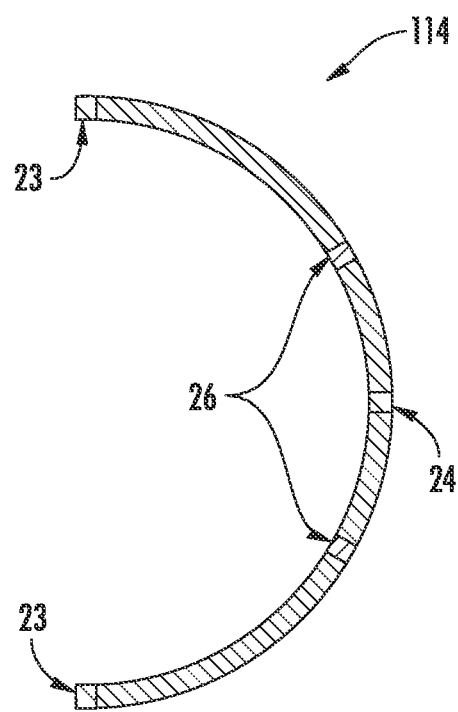
FIG. 5 is a front view of a portion of the sidewall display of the level of FIG. 1, according to an exemplary embodiment.
Figure 6:
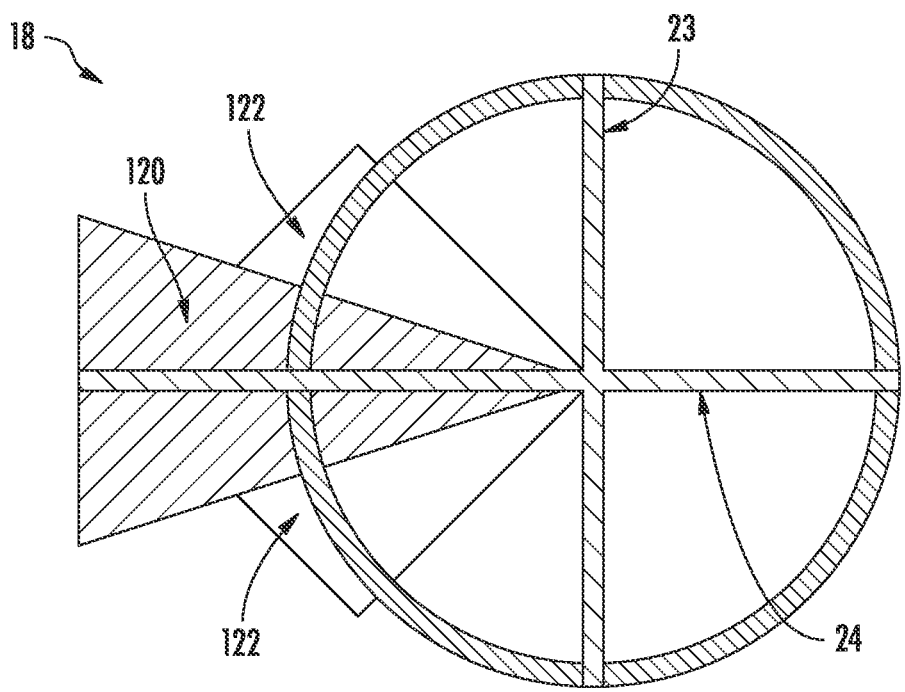
FIG. 6 is a demonstrative illustration of features in a level display, according to an exemplary embodiment.
Figure 7:
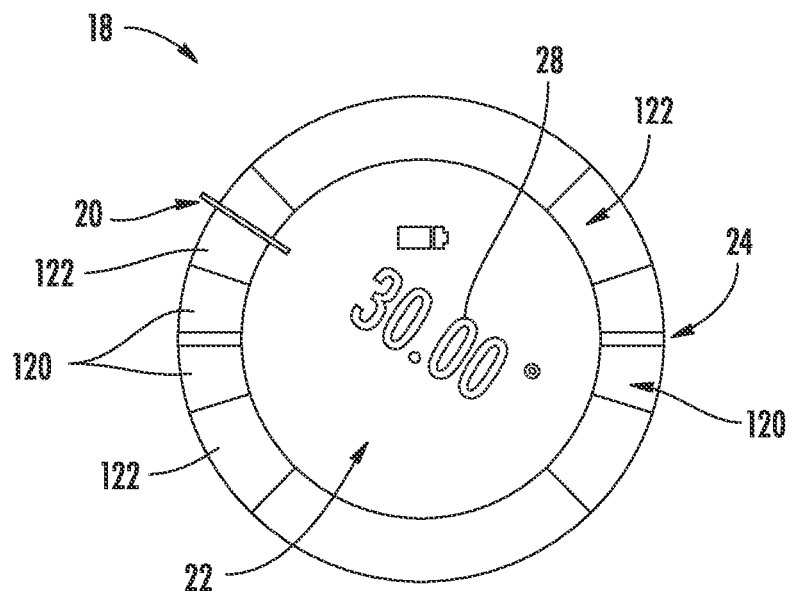
FIG. 7 is a front view of a level display, according to an exemplary embodiment.
Figure 8:
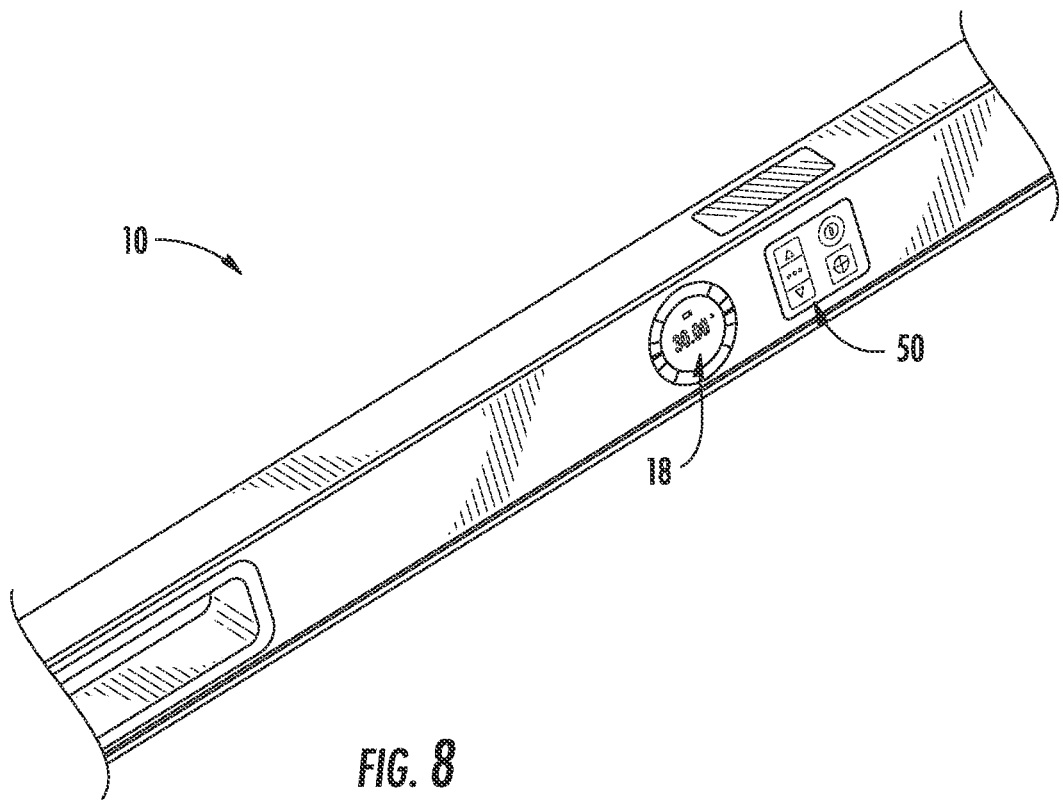
FIG. 8 is a perspective front view of a level, according to an exemplary embodiment.
Figure 9:
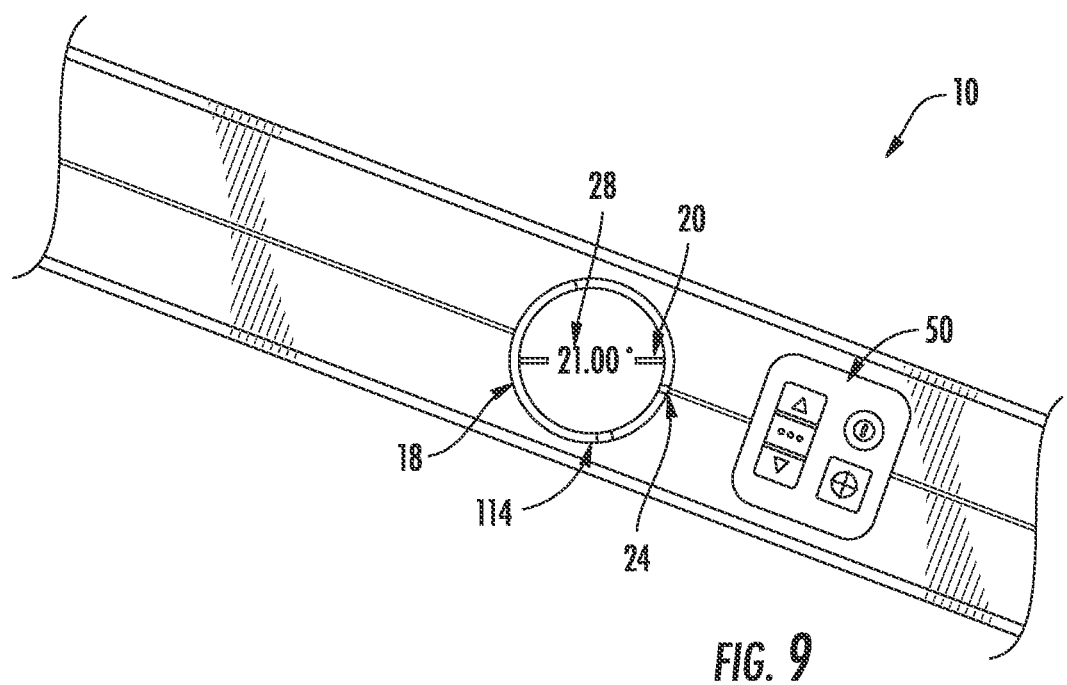
FIG. 9 is a front view of a level, according to an exemplary embodiment.

Turning now to FIGS. 4-6, display 18 operates in a coarse view mode when level 10 is outside of a view mode threshold of target 24, such as 3 degrees (best shown FIG. 5). When level 10 is within the view mode threshold of target 24, display 18 operates with a more detailed view (best shown FIG. 4). For example, when the orientation of level 10 (e.g., which may be represented by reading line 20) is more than 3 degrees away from target 24, display 18 displays coarse outer ring 114 (e.g., FIG. 5), and when the orientation of level 10 is within 3 degrees of target 24, display 18 transitions to displaying fine outer ring 116 (e.g., FIG. 4). In this example, level 10 having an orientation of 3 degrees away from target 24 refers to 1.5 degrees in either direction.

Continuing to refer to FIG. 4, detailed primary range 120 surrounds target 24 over 0.5 degrees of arc in either direction with respect to target 24. Detailed secondary range 122 adds another 1.0 degree of change in orientation beyond detailed primary range 120 to either end away from target 24. The combination of detailed primary range 120 and detailed secondary range 122 includes a total range of 1.5 degrees in either direction. However, although detailed primary range 120 and detailed secondary range 122 combined correspond to 1.5 degrees of changed orientation for level 10, detailed primary range 120 and detailed secondary range 122 visually extends approximately 30 degrees of circumferential arc around display 18 (best shown in FIG. 4) to either direction from target 24. Therefore, movement of reading line 20 within image 76 is an exaggerated representation of orientation changes to level 10. For example in this embodiment a single degree of change to the orientation of level 10 corresponds to reading line 20 transiting through 20 degrees of circumferential distance across detailed primary range 120 and/or detailed secondary range 122. This exaggerated movement of reading line 20 in image 76 as compared to the physical orientation change of level 10 assists the user in more easily making fine-tune adjustments to align a surface with a target orientation.

For illustrative example, when the orientation of level 10 is 1.5 degrees from target 24, reading line 20 is at reference point A in FIG. 4 with a 30 degree angle from target 24 in display 18 and aligned with an end of detailed secondary range 122 that is furthest from target 24. When the orientation of level 10 changes 0.5 degrees towards target 24, and is therefore 1.0 degrees from target 24, reading line 20 correspondingly circumferentially moves to reference point B in FIG. 4 halfway through detailed secondary range 122 toward detailed primary range 120. When the orientation of level 10 changes yet another 0.5 degrees towards target 24, and is therefore 0.5 degrees from target 24, reading line 20 correspondingly moves the rest of the way through detailed secondary range 122 to reference point C in FIG. 4, arriving at the intersection between detailed primary range 120 and detailed secondary range 122. When the orientation of level 10 changes still yet another 0.5 degrees towards target 24, and is therefore aligned with the target 24, reading line 20 correspondingly aligns with target 24 at reference point D in FIG. 4. In this example, even though the orientation of the physical level 10 itself only changed by 1.5 degrees in the physical world, the position of reading line 20 moved 30 degrees across fine outer ring 116.

In this example one degree of change to level's 10 orientation corresponds to 20 degrees of movement of reading line 20 around fine outer ring 116 (a ratio of 1:20::change of the orientation of level 10:circumferential movement of reading line 20 in display 18). In various other embodiments, other ratios are practiced (e.g., one:three or more, one:five or more, one:ten or more, and/or one:thirty or more).

During use of level 10, directional indicator 124 transmits the inner circumference of outer ring 112 in a circular rotation, such that dark edge 126 leads the front edge of directional indicator 124, and light edge 128 trails directional indicator 124. In one embodiment directional indicator 124 is very dark (e.g., high contrast to the background color) at dark edge 126 and directional indicator 124 slowly transitions to being relatively light (e.g., low to no contrast to the background color) at light edge 128. Directional indicator 124 transits the inner circumference of fine outer ring 116 in circumferential direction 100. In various embodiments, two directional indicators 124 circumferentially rotate around the inner circumference of fine outer ring 116 on opposite sides of fine outer ring 116. The speed of directional indicators 124 corresponds to the difference between target 24 and reading line 20, such that the further the orientation of level 10 is from the desired target, the faster directional indicator 124 rotates. The rotational direction of directional indicator 124 corresponds to the direction that level 10 needs to rotate to the targeted orientation. The rotational speed of directional indicator 124 corresponds to how close level 10 is to the target orientation (e.g., directional indicator 124 moves slower when the orientation of level 10 is within detailed primary range 120 than within detailed secondary range 122).

Turning to FIG. 6, illustrated therein is a graphical representation of the ranges that primary range 120 and secondary range 122 correspond to in an exemplary display 18. For example, primary range 120 covers approximately 20 degrees of arc in display 18 even though primary range 120 actually corresponds to 2 degrees of rotation of level 10, and secondary range 122 covers approximately 45 degrees of arc in display 18 even though secondary range 122 corresponds to 4.5 degrees of rotation of level. As indicated in FIG. 6, in one embodiment detailed primary range 120 extends the same circumferential distance in either direction from target 24. Detailed secondary range 122 similarly extends the same circumferential distance in either direction from each of acceptable margins 26.

In various embodiments the orientational precision of level 10 required to minimally satisfy the requirements of detailed primary range 120 and detailed secondary range 122 is selectable by a user. For example, in the embodiment(s) of FIGS. 4-6 the orientation of level 10 can be up to 0.5 degrees from the target orientation and satisfy the requirements of detailed primary range 120, or be between 0.5 degrees and 1.5 degrees from the target orientation and satisfy the requirements of detailed secondary range 122. In various other embodiments detailed primary range 120 is configured to correspond to no more than X degrees of orientation accuracy of level 10 (e.g., 0.1 degrees, 0.05 degrees). The adjustments to the accuracy requirements can be input to level 10, for example, via input module 50.

Turning to FIGS. 7-10, display 18 is in a coarse view because level 10 is not sufficiently close to the target orientation. Specifically, level 10 is oriented at an angle of thirty degrees with respect to level ground. As a result, reading 28 indicates a reading of "30.00" degrees and reading lines 20 are oriented at a corresponding thirty degree angle away from target 24.

Background 22 of display 18 changes color when level 10 is oriented within detailed primary range 120 of target 24. In one or more embodiments, target 24 is manually set to a target reading. For example, the targeted orientation of level 10 may be set by placing level 10 at the target orientation and pressing mark button 56. Alternatively, level 10 may be placed near the target orientation (e.g., the target orientation is 30 degrees, and level 10 is placed at 28.5 degrees), mark button 56 is depressed to set 28.5 as a temporary target, and input buttons 52 are used to manually adjust the target from 28.5 degrees to 30 degrees. As yet another alternative, the target orientation of level 10 may be manually set solely by use of input buttons 52.

In various embodiments, in situations in which the target orientation is other than level or plumb (e.g., if the target is 30 degrees), display 18 continues to display a non-zero reading 28 even when level 10 is oriented consistent with the target. Reading 28 displays the measured orientation of level 10 with respect to level ground, rather than displaying a difference between reading line 20 and target 24. In other embodiments reading 28 specifies the difference between reading line 20 and target 24. As level 10 approaches the targeted orientation, reading 28 increasingly approaches zero until reading 28 is at or near zero even when the target orientation is not itself zero.

Figure 10:
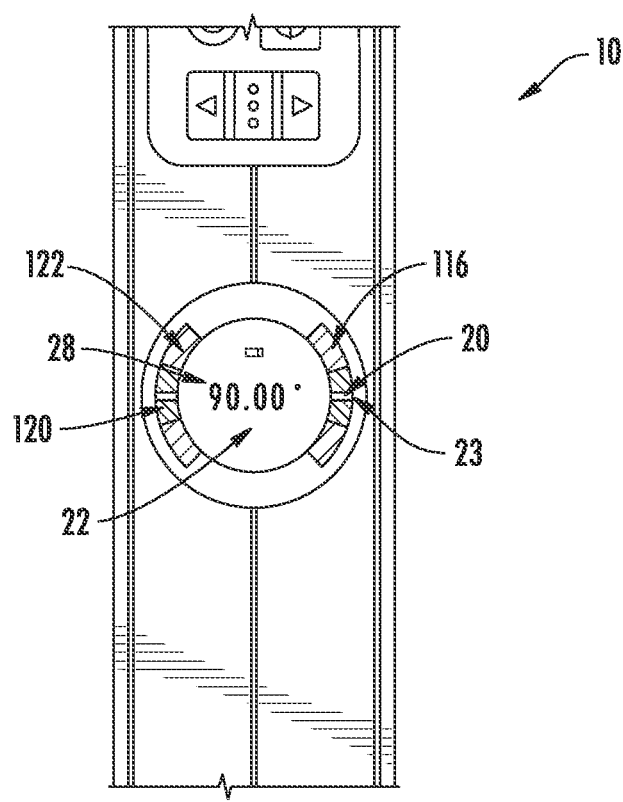
FIG. 10 is a front view of a level, according to an exemplary embodiment.

In the absence of a manually set target, target 24 is a default target such as one of level with level ground (e.g., a reading of 0 degrees) or target 24 is plumb to level ground (e.g., a reading of 90 degrees). As shown in FIG. 10, when level 10 is aligned with plumb 23 of level ground, and therefore within detailed primary range 120, background 22 changes to a first color (e.g., green). When level 10 is aligned with detailed secondary range 122 of target 24, background 22 changes to a second color (e.g., blue). In one embodiment level 10 changes target 24 from level ground to plumb depending on which is closer to the orientation of level 10.

By default, level 10 is configured to have target measurements of 0 degrees (parallel to level ground, or to put it another way perpendicular to the perceived force of gravity) or 90 degree (perpendicular to level ground, or to put it another way parallel to the perceived force of gravity). Accordingly, when level 10 has an orientation that approaches and/or equals one of those measurements, background 22 of display 18 may change color to indicate that the orientation is close and/or correct. To toggle the ability to configure custom-identified orientation targets, mark button 56 may be quickly pressed to enable/disable this functionality (e.g., turning Mark Mode on and off). When level 10 is positioned at a target orientation, mark button 56 may be held for a short period of time (e.g., two seconds) to indicate that this is the target orientation for level.

Figure 11:
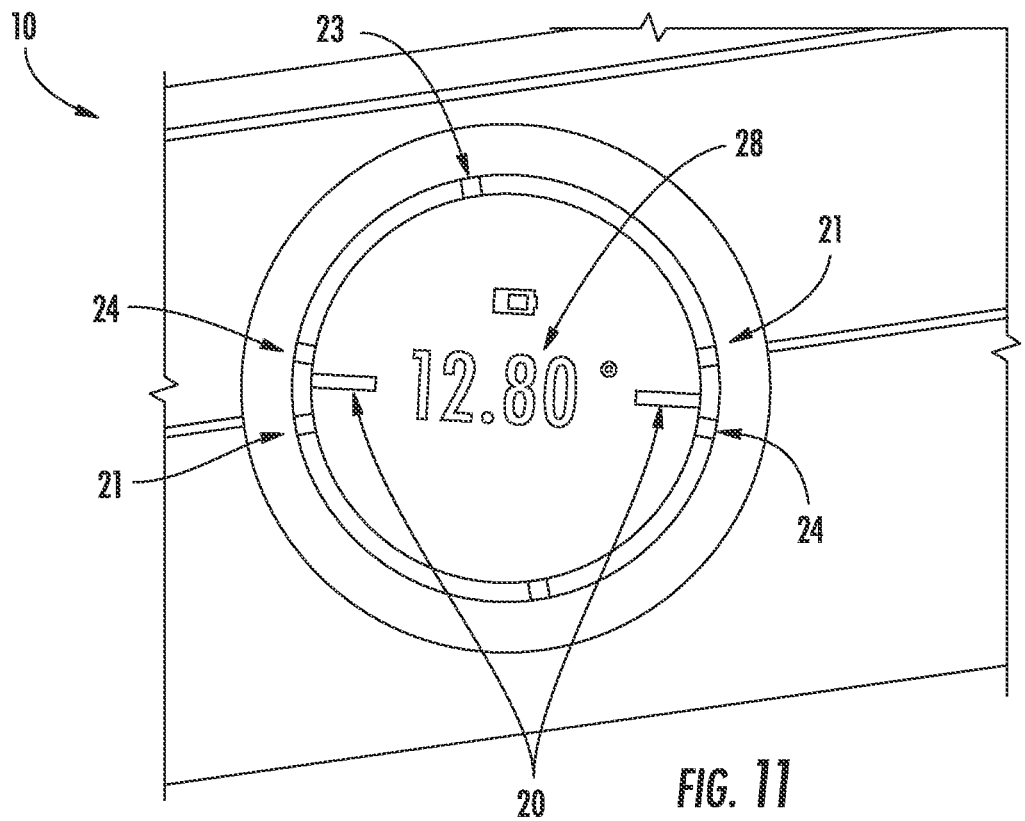
FIG. 11 is a front view of a level display, according to an exemplary embodiment.
Figure 12:
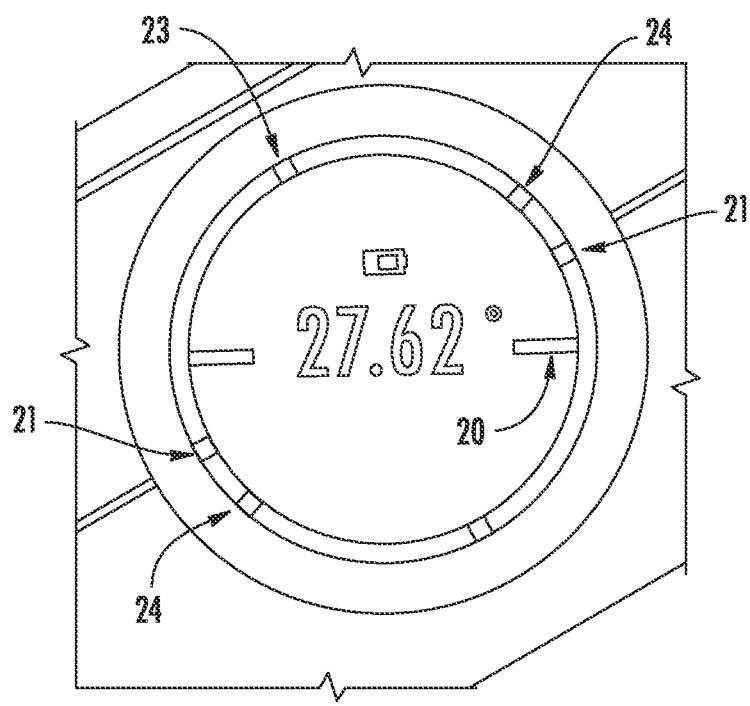
FIG. 12 is a front view of a level display, according to an exemplary embodiment.

Turning to FIGS. 11-12, level 10 further includes the ability to flip, or mirror-image, the target orientation of level 10 with respect to the perceived force of gravity. This can be useful if a measuring surface requires level 10 to face a different direction so that display 18 is not visible. Level 10 can be reconfigured so that the mirror-image of a target orientation is the desired target for the next measurement (e.g., in FIG. 12 target 24 is aligned with reading line 20 when the right-side of level 10 is 18.5 degrees above parallel to level ground 21). This flipping of the target mark for level 10 can be accomplished, for example, by double-tapping mark button 56. For example, if the target orientation is the left-side of the level being 13 degrees higher than the right-side of the level, the mirror-image target orientation is the right-side of the level being 13 degrees higher than the left-side of the level.

Figure 13:
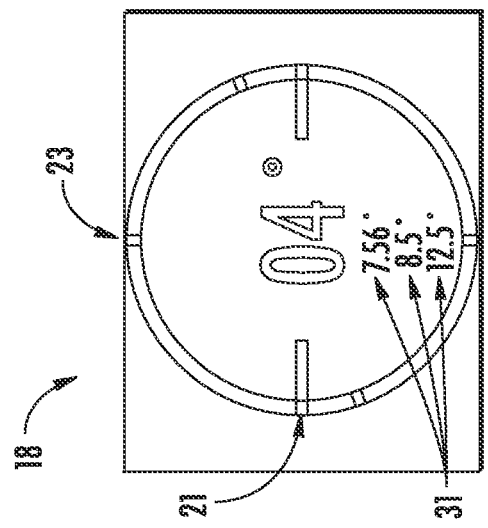
FIG. 13 is a front view of a level display, according to an exemplary embodiment.
Figure 14:
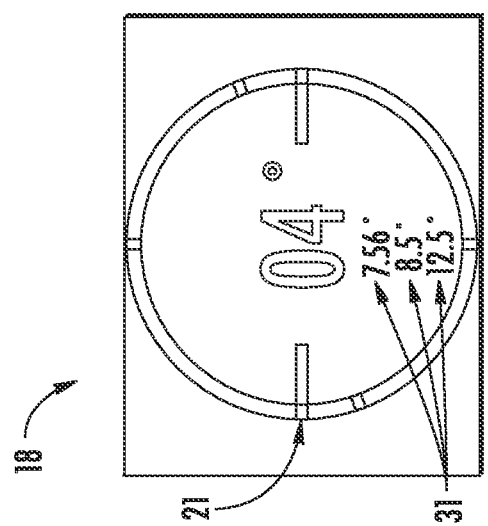
FIG. 14 is a front view of a level display, according to an exemplary embodiment.
Figure 15:
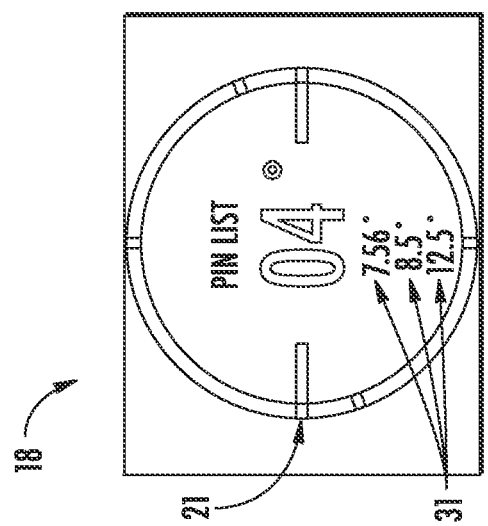
FIG. 15 is a front view of a level display, according to an exemplary embodiment.

Turning to FIG. 13-15, list 31 is displayed on display 18 and includes several (e.g., three) orientation measurements that can be selected. This allows users to quickly toggle between commonly occurring target orientations. The entries in list 31 can be selected by a user to set target 24 for level 10. For example, the first entry in list 31 is 7.56 degrees, the second entry in list 31 is 8.5 degrees, and the third entry in list 31 is 12.5 degrees. In response to a user selecting the second entry (best shown in FIG. 15), target 24 for level 10 becomes 8.5 degrees different than level ground. In various embodiments entries in list 31 is input to level 10, such as via input module 50. Entries in list 31 can be adjusted, added, and/or removed by a user.

Figure 16:
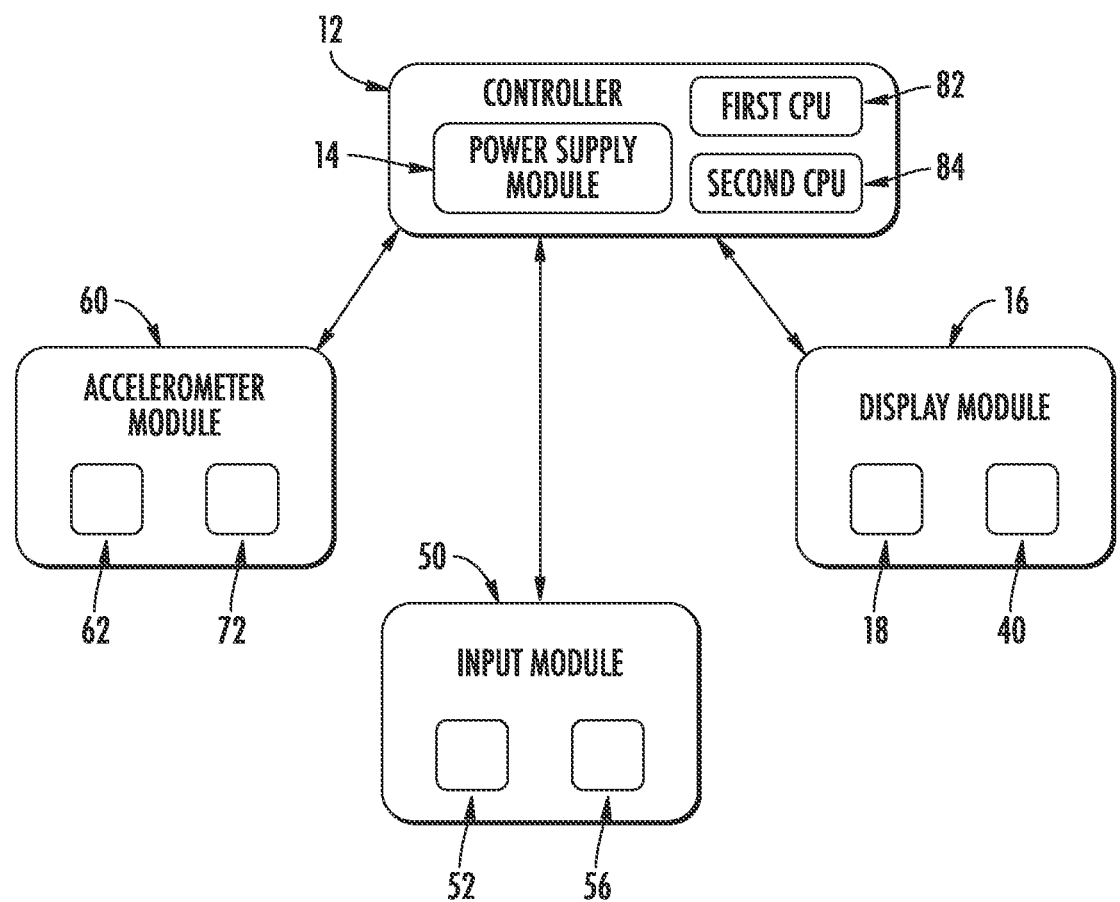
FIG. 16 is a block diagram of several modules of a control system of the level of FIG. 1, according to an exemplary embodiment

Referring to FIG. 16, controller 12 is in electrical communication with accelerometer module 60, input module 50, and display module 16. Controller 12 also controls power supply module 14, with a goal of minimizing energy expenditures from the battery or batteries. It is considered that controller 12 may be implemented via hardware, such as a microprocessor (e.g., an ASIC), software, firmware, and/or any combination thereof.

In one or more embodiments controller 12 calculates the orientation difference of level 10, determines which mode to operate in, determines which image(s), if any, to display on the one or more displays, and sends control signal(s) to the display to emit an image indicating the orientation difference. Controller 12 may utilize several modes, such as an active mode, a sleep mode, and a disabled functionality mode. The sleep mode and the disabled functionality mode are utilized to preserve battery power. In active mode, all of the features are enabled, and the display is fully lit (e.g., not dimmed). In disabled functionality mode, which may be activated when battery power is below a threshold, controller 12 may reduce power supply to any of several features, such as one or more displays may be dimmer, one of the displays may be entirely turned off, the level may enter sleep mode after a threshold period of time that is shorter than during normal operations, only one of the accelerometers may be utilized, etc.

Further, the disabled functionality mode may prioritize electronic/powered features within the level when the battery level is low. For example, such a method may disable certain features, such as lighting features (e.g., the background color) or sound features (e.g., notifications that the orientation is within one of the ranges), in order to maintain sufficient power for other features. Such basic features may include the position/level sensors and the digital display of level/position information on a digital level display.

Controller 12 may enter a sleep mode, which disables all features of level 10 except the power button 54 and the ability to charge the battery/batteries. Sleep mode may be entered because any of several triggers are detected, such as if the power button is engaged to toggle level 10 off, if there is no user input for a threshold period of time, if there is no movement for a threshold period of time, if there is too much movement for a threshold period of time (e.g., if level 10 is being carried during a lengthy walk), etc.

Turning back to FIG. 16, controller 12 has several features and configurations to preserve battery power. One aspect of the power saving features is based on level 10 including at least two processors. In the embodiment schematically illustrated in FIG. 16, level 10 includes first CPU 82 and second CPU 84. First CPU 82 utilizes more power than second CPU 84. For example, first CPU 82 may operate at a faster clock speed, it may be a physically larger processor, it may measure orientation of level to a greater level of accuracy (e.g., to hundredths of degrees (e.g., 18.23 degrees) as opposed to whole degrees (e.g., 18 degrees)), it may have increased functionality, etc. In various embodiments processors other than a CPU may be utilized, including without limitation, an MCU, an MPU, and/or an ASIC.

As a result, it behooves controller 12 to selectively disable and/or reduce the power draw by first CPU 82 to provide support for the operation of level 10. While first CPU 82 is disabled and/or has a reduced functionality, in various embodiments controller 12 relies on second CPU 84 to monitor operations of level 10 and to determine whether and when to activate first CPU 82.

Controller 12 operates using several modes. One mode is the "Off Mode", in which most or all components of level 10 are disabled with the exception of power button 54. Another mode is the "On Mode", in which at least first CPU 82 is operational, and thus at least a majority of features of level 10 are operational.

Another mode is a "Sleep Mode", in which level 10 is powered on but has reduced functionality. For example, when level 10 has not been moved for a period of time (e.g., 2 minutes), as a result of that stasis, controller 12 places level 10 in Sleep Mode, in which first CPU 82 is disabled and/or has reduced functionality and second CPU 84 is enabled and utilized by controller 12. In another example, when level 10 is placed with an unusable orientation (e.g., if front display 18 is facing towards the ground, such as if level 10 is placed face-down on a table or workpiece, or if front display 18 is placed face-up), controller 12 may place level 10 in Sleep Mode.

Another mode is "Power Save Mode", in which level 10 is still active but has a reduced functionality. For example, in this mode at least one of first display 18 or second display 40 may be disabled and/or have partial functioning (e.g., display 18 or 40 may be dimmed). As another example, in this mode first CPU 82 may be disabled, and as a result level 10 has a reduced accuracy of orientation measurements (e.g., the orientation of level 10 can only be determined to a whole degree of accuracy (e.g., 18 degrees), rather than a more precise measurement, such as to tenths of degrees (e.g., 18.1 degrees) or hundredths of degrees (e.g., 18.23 degrees)).

Level 10 may be manually placed in Power Save Mode by a user selecting this mode via input module 50. Alternatively, level 10 may be placed in Power Save Mode as a result of a reduced power supply that is available to level 10.

Another mode is "Depleted Mode", in which level 10 has a restricted functionality. Level 10 enters this mode when the power supply available is below a certain threshold (e.g., 10 percent, 20 percent). In Depleted Mode, similar to Power Save Mode, at least one of first display 18 or second display 40 may be disabled and/or have partial functioning (e.g., display 18 or 40 may be dimmed). For example, in Depleted Mode first display 18, which may consume more power than second display 40, is disabled.

Figure 17:
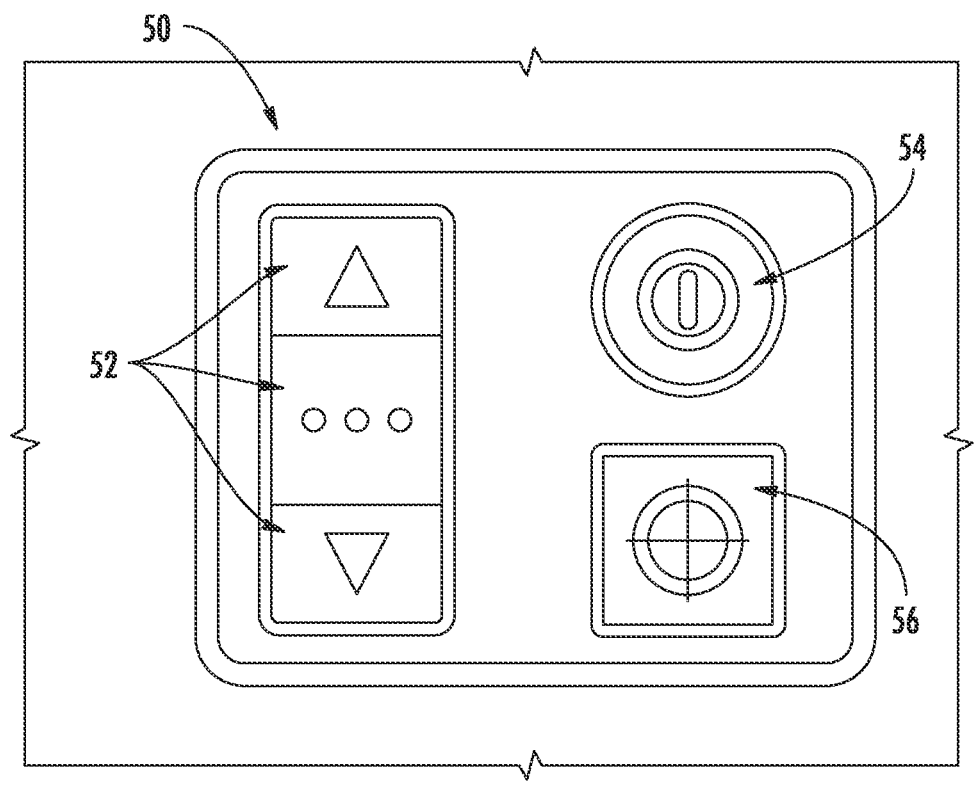
FIG. 17 is detailed front view of an input device of the level of FIG. 1, according to an exemplary embodiment

Turning now to FIG. 17, in various embodiments input module 50 comprises "Menu/select" button 52, labeled " . . . ", that allows the user to open a menu for level 10. The user cycles through menu options by continuing to press the " . . . " button 52, or the user cycles through menu options by pressing the up or down arrow buttons 52.

Input module includes comprises input buttons 52, a power button 54, and a mark button 56. Mark button 56 allows a user to "mark" an orientation of the level on a selected surface as the target orientation for future surfaces. For example, if a cross beam is oriented at a certain angle with respect to the ground (e.g., 2 degrees), level 10 can be placed on the target support beam. Mark button 56 is then used to indicate to controller 12 in level 10 that the angle of the target support beam should be memorized and duplicated in future readings. Alternatively, a target angle for level 10 may be set by the user via input buttons 52.

The input buttons may be used to adjust various settings of level 10, including language settings (e.g., what language to use), adjusting the various ranges (e.g., primary target range 36, secondary target range 38, detailed primary range 120, and/or detailed secondary range 122), adjusting the default thresholds to enter sleep and/or disabled functionality modes (both discussed further below), and notifications (e.g., which background colors indicate which orientations).

Figure 18:
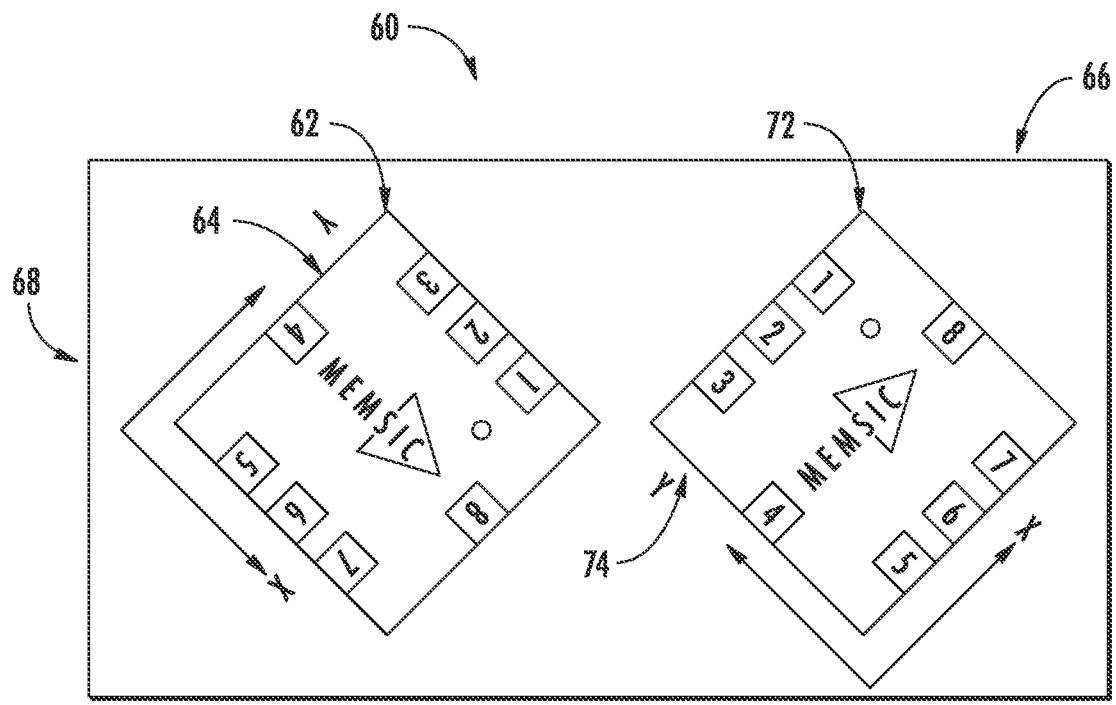
FIG. 18 is a block diagram of an orientation sensor including two accelerometers in the level of FIG. 1, according to an exemplary embodiment
Figure 19:
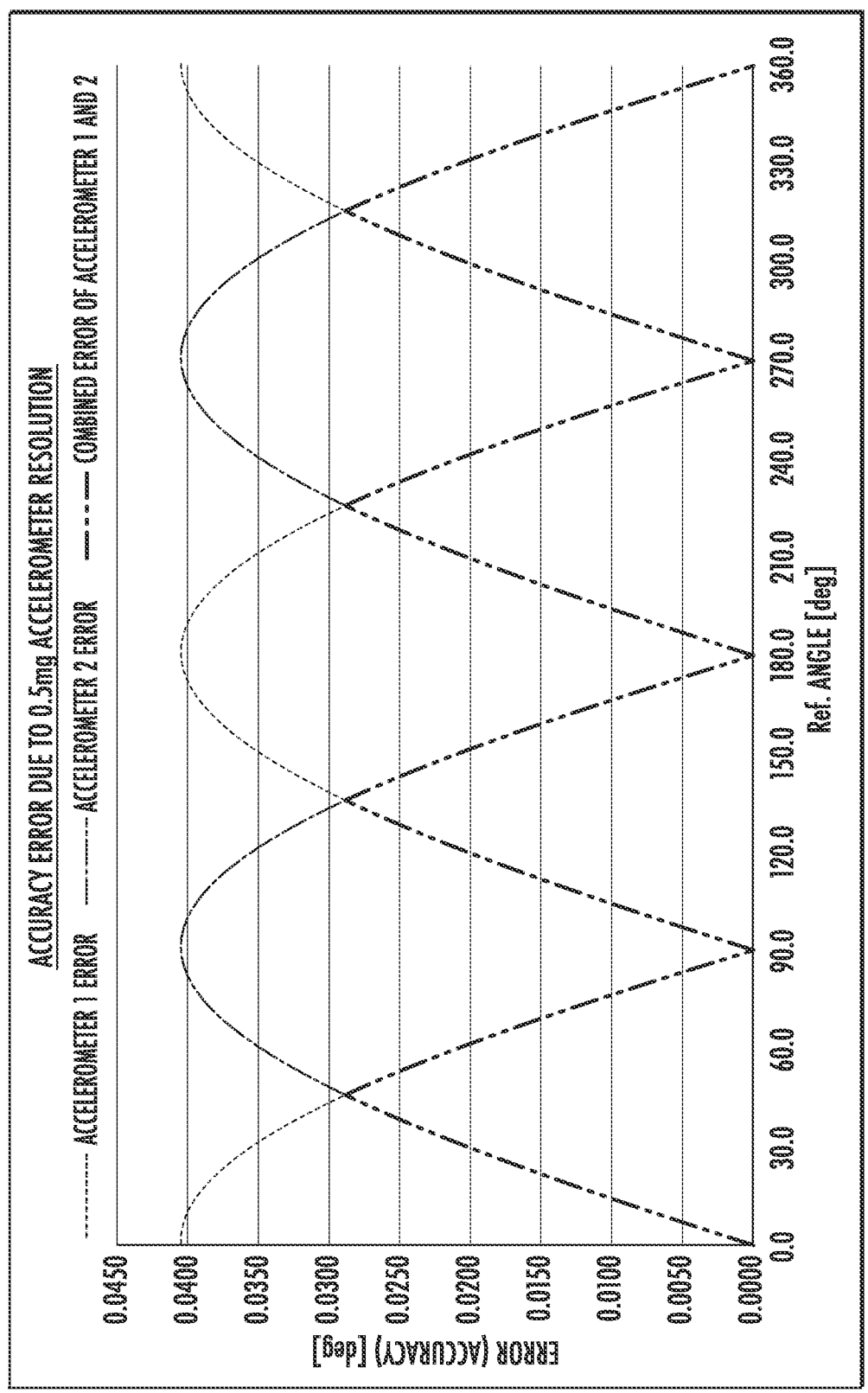
FIG. 19 is a chart of error measurement estimates of accelerometers at the orientations illustrated in FIG. 18, according to an exemplary embodiment.

FIGS. 18-19 illustrate an exemplary accelerometer module 60 in level 10. In this embodiment, bottom 64 of first accelerometer 62 is on the top left, bottom 74 of second accelerometer 72 is on the bottom left, and bottom 68 of accelerometer module 60 is on the left, from the perspective of FIG. 18. Bottom 68 of accelerometer module 60 is generally coplanar with measuring surface 8 of level 10. Thus, first accelerometer 62 has a first angular position relative to measuring surfaces (e.g., 6 and 8) of level 10 and second accelerometer 72 has a different second angular position relative to measuring surfaces (e.g., 6 and 8) of level 10. In this embodiment, first accelerometer 62 is oriented at a +45 degree (positive forty-five degree) angle with respect to measuring surface 8 on the bottom of level 10 and also relative to accelerometer housing 66. The positive aspect of this angle indicates that the rotation is clockwise with respect to the selected viewing perspective, which in this example is illustrated in FIG. 18. Thus, in this embodiment first accelerometer 62 is oriented at a −45 degree angle to housing 15. Based on the position of bottom 74 of second accelerometer 72, it can be seen that second accelerometer 72 is oriented at a −45 degree (negative forty-five degree) angle with respect to measuring surface 8 on the bottom of level 10 and also relative to accelerometer housing 66. The negative aspect of this angle indicates that the rotation is counter-clockwise with respect to the selected viewing perspective, which in this example is illustrated in FIG. 18.

Therefore, in this embodiment first accelerometer 62 has a first angular position relative to a first measuring surface of level 10, and second accelerometer 72 has a different second angular position relative to first measuring surface of level. First accelerometer 62 and second accelerometer 72 are oriented at a 90 degree angle with respect to each other. This complimentary orientation of first and second accelerometers provides a more precise measurement at the orientations that are most typical, i.e., 0 degrees, 90 degrees, 180 degrees, and 270 degrees. The margin of error at those angles may be at or approach zero (see FIG. 19), while the maximum margin of error at other angles (i.e., 45 degrees, 135 degrees, 225 degrees, 315 degrees) still remains small.

In another embodiment first accelerometer 62 and second accelerometer 72 are rotationally oriented relative to each other so that they have different orientations with respect to the housing (e.g., one accelerometer is 30 degrees off level compared to the housing and the other accelerometer is 60 degrees off level compared to the housing).

As is illustrated in FIG. 19, in the orientation described and illustrated in FIG. 18, first accelerometer 62 has its most precise measurements at 90 degrees and 270, while second accelerometer 72 has its most precise measurements at 0 degrees and 180 degrees and 360 degrees (which is equivalent to 0 degrees).

In one or more embodiments, where the measurements of the two accelerometers is unequal, only the measurement from the more precise accelerometer is used and communicated to the user. However, it is contemplated that the two measurements could be combined to generate output for the user (e.g., an average of the two measurements, a weighted average whereby the more precise accelerometer measurement, such as according to the chart in FIG. 19, is given a greater weight).

In one or more embodiments level 10 does not include vials with liquid and an air bubble, although in an alternative embodiment digital level 10 may also include such vials, such as is shown in FIG. 20. Vials may be oriented in complimenting orientations, such as perpendicular and aligned with longitudinal axis 4 of housing 15.

Further, in one or more embodiments level 10 includes second display 40, which is disposed on a top surface of housing 15. Second display 40 communicates a number representing the angle of level 10, a number representing the target angle, and optionally a symbol that indicates which side of level 10 may be too high or low. However, it is contemplated that second display 40 includes some or all of the graphical elements in first display 18.

As referenced throughout, the term level ground refers to ground that is generally coplanar to the plane perpendicular to the perceived force of gravity.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

We claim:
1. A level, comprising:
a housing comprising a longitudinal axis;
a planar base surface extending parallel to the longitudinal axis;
a first orientation sensor configured to measure a housing orientation, the housing orientation defined by an orientation of the housing with respect to the force of gravity;
a controller that calculates an orientation difference between the housing orientation and a target orientation; and
a display that emits an image comprising an exaggerated representation of the orientation difference.

2. The level of claim 1, wherein the exaggerated representation is at least three times the orientation difference.

3. The level of claim 1, further comprising a second orientation sensor configured to measure the orientation of the housing with respect to the force of gravity, wherein the first orientation sensor and the second orientation sensor are oriented relative to each other such that the first orientation sensor and second orientation sensor have different orientations with respect to the housing.

4. The level of claim 3, wherein the second orientation sensor is oriented at a 90 degree angle with respect to the first orientation sensor.

5. The level of claim 1, wherein the display rotates the image in response to rotation of the housing, such that the image maintains a consistent orientation with respect to a perceived direction of the force of gravity.

6. The level of claim 1, wherein the image further comprises a reading line and the exaggerated representation of the image comprises a first angle, wherein the reading line transits along the first angle.

7. The level of claim 6, wherein the first angle is at least three times the orientation difference.

8. The level of claim 7, wherein the first angle is at least ten times the orientation difference.

9. A level, comprising:
a housing comprising a longitudinal axis and a planar base surface;
an orientation sensor configured to measure an orientation of the housing with respect to the force of gravity;

a controller that calculates an orientation difference between the housing orientation and a target orientation; and a display that emits an image, the image comprising:
the target orientation;
a primary range that extends a first circumferential distance from the target orientation; and
a secondary range that extends a second circumferential distance from the target orientation greater than the first circumferential distance.

10. The level of claim 9, wherein the secondary range is a fixed distance broader than the primary range.

11. The level of claim 10, wherein the fixed distance is between 0.5 degrees and 20 degrees.

12. The level of claim 9, wherein the secondary range is a fixed percentage broader than the primary range.

13. The level of claim 12, wherein the fixed percentage is between 25% and 400%.

14. The level of claim 9, wherein the first circumferential distance extends symmetrical distances away from either side of the target orientation.

15. The level of claim 9, wherein the second circumferential distance extends symmetrical distances away from either side of the target orientation.

16. A level, comprising:
a housing with a longitudinal axis;
a power supply;
an orientation sensor configured to measure an orientation of the housing with respect to the force of gravity;
a controller that calculates an orientation difference between the housing orientation and a target orientation; and
a first display that emits an image of the orientation difference;
wherein the controller determines to enter a Depleted Mode when the power supply is below a predetermined threshold; and
wherein, when in the Depleted Mode, the first display has restricted functionality.

17. The level of claim 16, further comprising a second display, wherein, when in Depleted Mode, the controller dims at least one of the first display or the second display.

18. The level of claim 16, further comprising a second display, wherein, when in Depleted Mode, the controller disables at least one of the first display or the second display.

19. The level of claim 16, further comprising a first processor and a second processor, wherein, when in Depleted Mode, the controller reduces power to at least the first processor or the second processor.

20. The level of claim 16, wherein, when in Depleted Mode, the level operates at reduced functionality, and wherein the orientation sensor continues to receive power from the power supply and measure an orientation of the housing with respect to the force of gravity.

* * * * *